United States Patent
Ono et al.

(10) Patent No.: US 6,705,420 B2
(45) Date of Patent: Mar. 16, 2004

(54) STEERING ANGLE RATIO CONTROL SYSTEM AND METHOD

(75) Inventors: Hitoshi Ono, Kanagawa (JP); Yuusuke Kato, Tokyo (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/268,968

(22) Filed: Oct. 11, 2002

(65) Prior Publication Data

US 2003/0079932 A1 May 1, 2003

(30) Foreign Application Priority Data

Oct. 12, 2001 (JP) ........................... 2001-315534
Sep. 19, 2002 (JP) ........................... 2002-273047

(51) Int. Cl.$^7$ ............................................. B62D 5/30
(52) U.S. Cl. ........................ 180/407; 180/402; 701/43
(58) Field of Search .......................... 180/407, 443, 180/405, 444, 402; 701/41, 43

(56) References Cited

U.S. PATENT DOCUMENTS

| | | | |
|---|---|---|---|
| 4,573,545 A | | 3/1986 | Kalns |
| 4,789,040 A | | 12/1988 | Morishita et al. |
| 5,295,550 A | | 3/1994 | Chikuma |
| 5,355,315 A | * | 10/1994 | Daido et al. .................. 701/41 |
| 6,176,341 B1 | * | 1/2001 | Ansari ........................ 180/402 |
| 6,326,753 B1 | * | 12/2001 | Someya et al. .............. 318/471 |
| 6,334,503 B1 | * | 1/2002 | Fukumura et al. .......... 180/446 |
| 6,338,016 B1 | * | 1/2002 | Miller et al. .................. 701/43 |
| 2001/0026134 A1 | * | 10/2001 | Fukumoto et al. .......... 318/430 |
| 2002/0079155 A1 | * | 6/2002 | Andonian et al. .......... 180/402 |
| 2002/0179363 A1 | * | 12/2002 | Takatsuka et al. .......... 180/446 |

FOREIGN PATENT DOCUMENTS

| | | |
|---|---|---|
| EP | 1 162 126 A1 | 12/2001 |
| JP | 10-100913 A | 4/1998 |
| JP | 11-099956 A | 4/1999 |

OTHER PUBLICATIONS

Patent Abstracts of Japan, vol. 010, No. 249, Aug. 27, 1986, JP 61–077570, Apr. 21, 1986.

* cited by examiner

Primary Examiner—Avraham Lerner
(74) Attorney, Agent, or Firm—Foley & Lardner

(57) ABSTRACT

A steering angle ratio control system is provided which includes a steering angle ratio varying mechanism capable of varying a steering angle ratio by an electric drive unit, and a controller for controlling the steering angle ratio varying mechanism based on a steering angle ratio determined by a steering angle ratio determining section. The controller includes an electric drive unit overheat protecting section that determines, when the temperature of the electric drive unit rises beyond a predetermined temperature, a smaller steering angle ratio as compared with a steering angle ratio determined thereby when the temperature of the electric drive unit is lower than the predetermined temperature. A steering angle ratio control method is also provided.

6 Claims, 9 Drawing Sheets

STEERING ANGLE RATIO CONTROL SYSTEM AND METHOD

BACKGROUND OF THE INVENTION

The present invention relates to a steering angle ratio control system and method capable of varying the ratio of a steered angle of steerable road wheels to a steering angle of a steering wheel, i.e., a steering angle ratio by means of an electric driving mechanism such as an electric motor.

An electric power steering system adapted to assist a manual steering operation or effort by a power of an electric motor and a variable steering angle ratio steering system capable of varying the steering angle ratio have a possibility that a large current flows through an electric motor to overheat the electric motor if a steering wheel is held at a steering lock position or turned repeatedly to the steering lock position for a long time.

For carrying out a method of protecting an electric motor from such overheating, there has been, for example, an electric power steering control system that includes a torque sensor for detecting a steering torque of a steering wheel, an electric motor for assisting rotation of a steering shaft integral with the steering wheel, and a controller for controlling an operation of an electric motor in accordance with the steering toque. The controller estimates the temperature of the winding of the electric motor and decreases, when the temperature of the winding exceeds a certain limit, a counterelectromotive force constant that determines the angular velocity of the electric motor based on the temperature of the overheated winding thereby executing an electric motor temperature control (refer to Japanese Patent Provisional Publication No. 10-100913).

SUMMARY OF THE INVENTION

The above-described electric power steering control system can control the angular velocity of the electric motor and the current value for protecting the electric motor from overheating by decreasing the counterelectromotive force constant when the temperature of the winding of the electric motor estimated by the controller exceeds a certain limit value. The control system thus can prevent lack of torque similarly to the case of restricting the current value itself. However, by restricting the angular velocity, the responsiveness of the electric motor is lowered, thus making slower the response of the assist operation to the steering operation.

Figure 9:
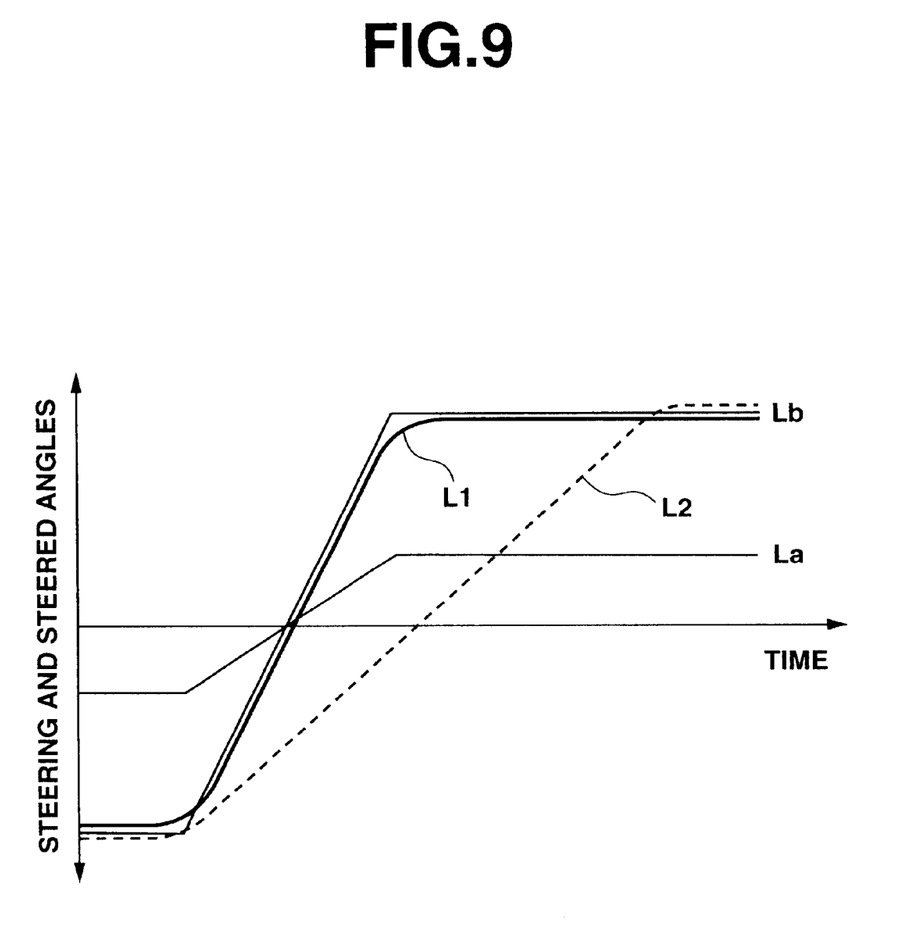
FIG. 9 is a graph showing a relation between steering and steered angles and elapsed time in a steering system of a related art.

Further, in case the above-described electric motor protecting method is applied to a variable steering angle ratio steering system capable of varying the steering angle ratio by the operation of the electric motor, a steered angle of steerable road wheels that is varied depending upon a variation of a steering angle by a steering operation and an elapsed time needed for a variation of the steered angle in response to a variation of the steering angle is obtained as shown in FIG. 9. Namely, in case the electric motor has no restriction on the angular velocity but is supplied with a normal current value, a good responsiveness of the electric motor is obtained. For example, when the steering wheel is turned from a lock position for limiting its counterclockwise turning to another lock position for limiting its clockwise turning, an actual steered angle, as indicated by the line L1 in FIG. 9, is nearly the same as the target steered angle indicated by the line Lb, in response to the input angle (steering angle) indicated by the line La and therefore the actual steered angle can be responsive to the steering angle without deteriorating the responsiveness. However, in case the electric motor is restricted in the angular velocity, with the same load, thereby restricting the current value, a delay in the responsiveness of the electric motor is caused so that there is caused a delay of the actual steered angle shown by the dotted line L2 in reaching the target steered angle shown by the line Lb, thus causing a problem that a desired responsiveness cannot be attained.

It is accordingly an object of the present invention to provide a steering angle ratio control system and method capable of varying the steering angle ratio by means of an electric motor, which can protect overheat of the electric motor while maintaining a good responsiveness with which the steered angle can be varied in response to a variation of the steering angle.

According to an aspect of the present invention, there is provided a steering angle ratio control system comprising a steering angle sensor for detecting a steering angle of a manual steering operating device, a steered angle sensor for detecting a steered angle of steerable road wheels, a vehicle speed sensor for detecting a vehicle speed, a steering angle ratio varying mechanism having an electric drive unit and capable of varying a steering angle ratio by the electric drive unit, a temperature sensor for detecting the temperature of the electric drive unit, and a controller for controlling the steering angle ratio varying mechanism, the controller including a steering angle ratio determining section for determining a steering angle ratio based on the vehicle speed, a target steered angle calculating section for calculating a target steered angle of the steerable road wheels based on the steering angle ratio determined by the steering angle ratio determining section, and a steering angle ratio control section for controlling the steering angle ratio varying mechanism so that the steered angle of the steerable road wheels and the target steered angle coincide with each other, wherein the steering angle ratio determining section includes an electric drive unit overheat protecting section that determines a smaller steering angle ratio when the temperature of the electric drive unit rises beyond a predetermined temperature as compared with a steering angle ratio determined thereby when the temperature of the electric drive unit is lower than the predetermined temperature.

According to another aspect of the present invention, there is provided a steering angle control method comprising detecting a steering angle of a manual steering operating device, detecting a steered angle of steerable road wheels, providing a steering angle ratio varying mechanism having an electric drive unit and capable of varying a steering angle ratio by the electric drive unit, detecting a vehicle speed, determining a steering angle ratio based on the vehicle speed, calculating a target steered angle of the steerable road wheels based on the determined steering angle ratio, detecting the temperature of the electric drive unit, and controlling the steering angle ratio varying mechanism so that the steered angle of the steerable road wheels and the target steered angle coincide with each other, wherein the determining includes determining a smaller steering angle ratio when the temperature of the electric drive unit rises beyond a predetermined temperature as compared with that when the temperature of the electric drive unit is lower than the predetermined temperature.

DESCRIPTION OF THE PREFERRED EMBODIMENTS

Figure 1:
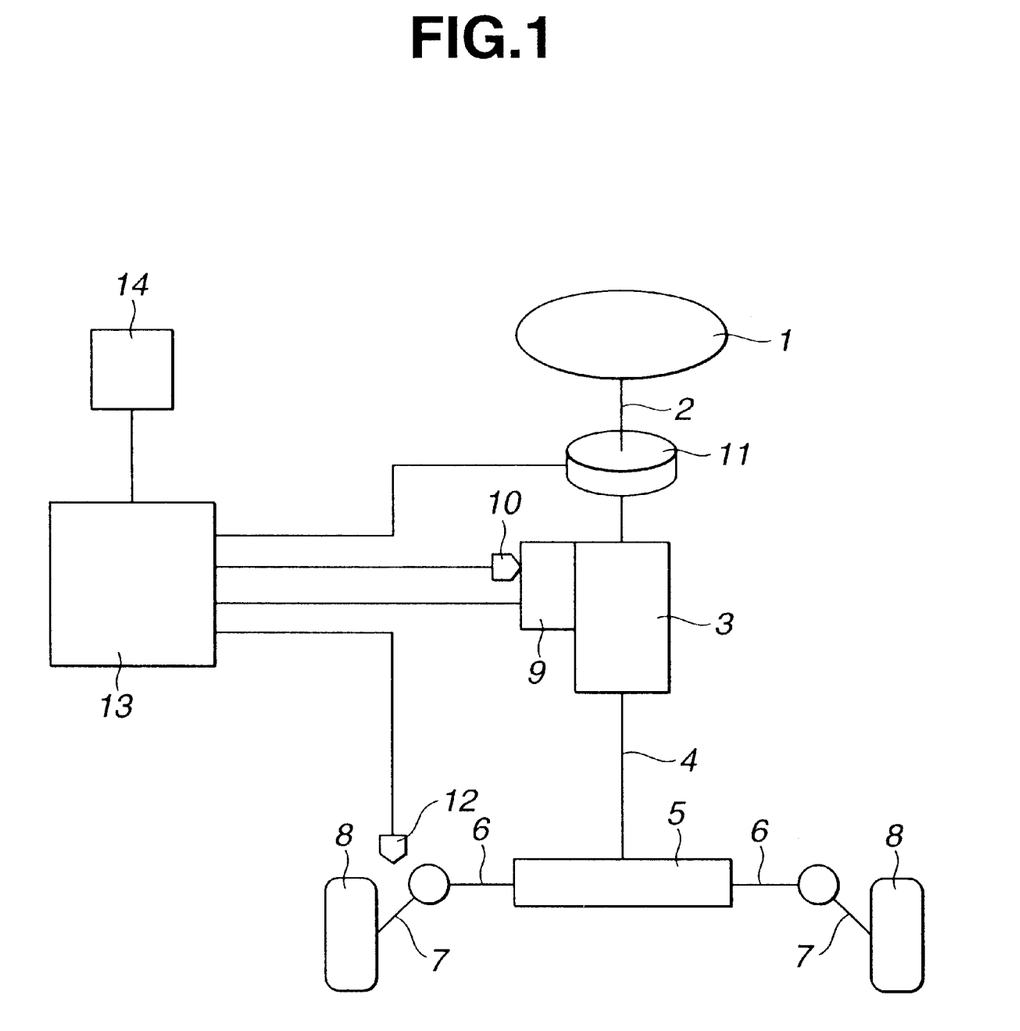
FIG. 1 is a schematic view of a steering angle ratio control system according to a first embodiment of the present invention.

Referring to FIG. 1, indicated by 1 is a steering wheel. Steering wheel 1 is connected to an input side of steering angle ratio varying mechanism 3 by way of steering shaft 2. An output side of steering angle ratio varying mechanism 3 is connected to steerable road wheels 8 by way of pinion shaft 4, steering gear 5, tie rods 6 and knuckle arms 7. Steering angle ratio varying mechanism 3 is provided with electric motor 9 that serves as an electric drive unit. Though not shown, a rotary encoder is provided for detecting a rotational angle and the direction of rotation of electric motor 9. Steering angle ratio varying mechanism 3 constitutes a steering angle ratio varying means.

To electric motor 9 is provided temperature sensor 10 for detecting temperature $T_M$ of electric motor 9. To steering shaft 2 is provided steering angle sensor 11 for detecting steering angle $\theta_S$ of steering wheel 1 that is operated by a driver. Further, to at least one of four road wheels 8, though two road wheels are not shown, is provided vehicle speed sensor 12 for detecting vehicle speed V, i.e., for outputting road wheel speed of the frequency corresponding to the rotational speed.

Steering angle ratio varying mechanism 3, as disclosed in Japanese Patent Provisional Publication No. 11-99956, has an input shaft whose axis is movable within a predetermined range ($A_0$ to $A_2$) and is capable of producing a difference in the rotational angle between the input shaft and an output shaft by varying the eccentricity between the input shaft and the output shaft. Namely, steering angle ratio varying mechanism 3 is capable of varying the steering angle ratio ($R_0$ to $R_2$) between an input angle and an output angle by moving the axis of the input shaft by utilizing the rotational power of electric motor 9.

Electric motor 9 in steering angle ratio varying mechanism 3 is controlled by controller 13. Controller 13 is made up of, for example, a microcomputer and supplied with, as an input, a signal representative of temperature $T_M$ detected by temperature sensor 10, a signal representative of steering angle $\theta_S$ detected by steering angle sensor 11 and a signal representative of vehicle speed V detected by vehicle speed sensor 12. Controller 13 executes an electric motor overheat protection process of FIG. 2, that will be described later, and outputs a command of drive to electric motor 9 based on the calculated process result and outputs a warning signal to warning circuit 14 when the temperature of electric motor 9 exceeds an overheat temperature higher than a predetermined temperature.

The procedure of the electric motor overheat protection process that is executed by controller 13 will now be described with reference to the flowchart of FIG. 2.

Figure 2:
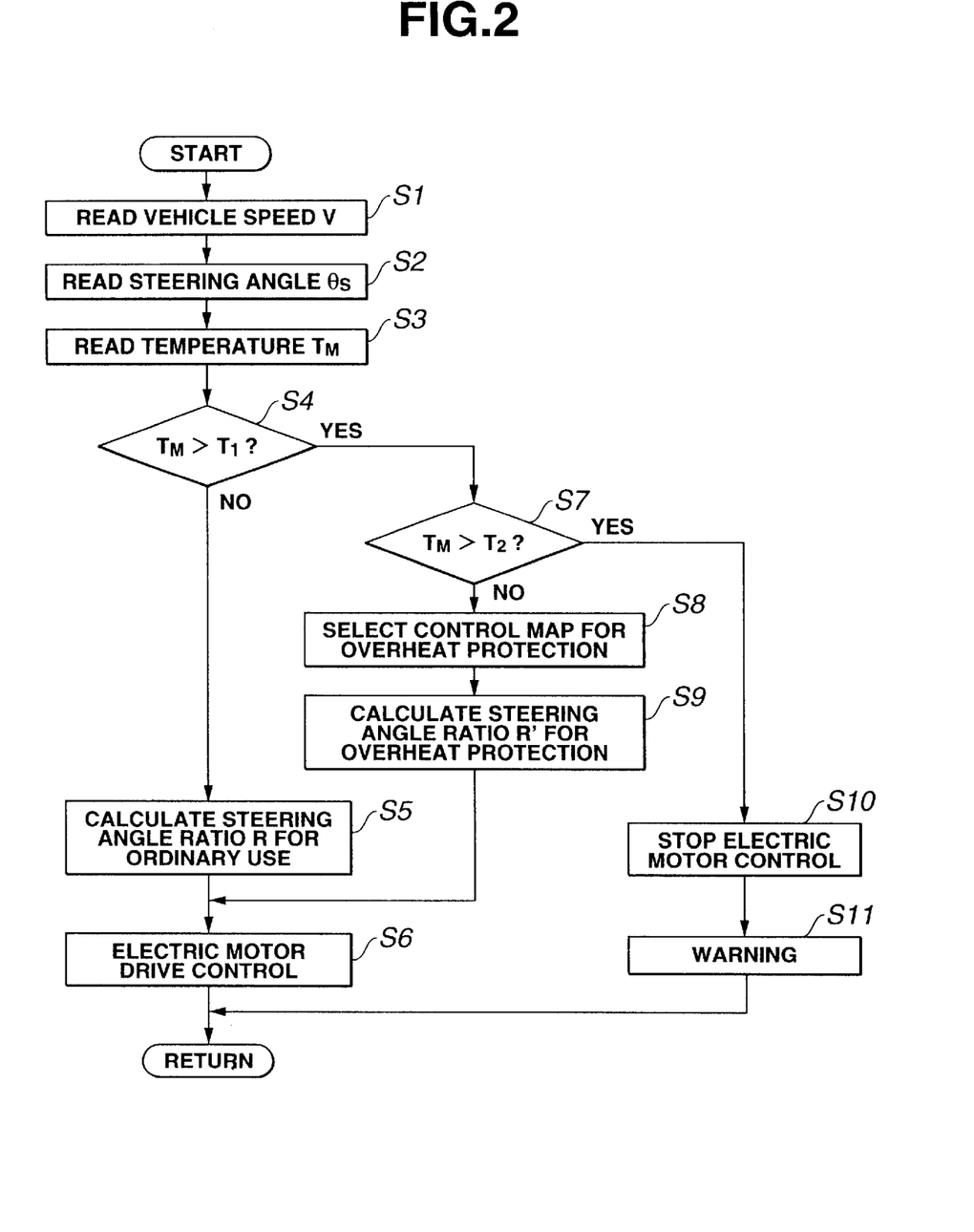
FIG. 2 is a flowchart of a control for protecting an electric motor from overheating that is executed by the first embodiment.

Controller 13 always executes the electric motor overheat protection process shown in FIG. 2. Firstly, in steps S1, S2 and S3, vehicle speed V detected by vehicle speed sensor 12, steering angle $\theta_S$ detected by steering angle sensor 11 and temperature $T_M$ of electric motor 9 detected by temperature sensor 10 are read, respectively. Then, the program proceeds to step S4.

In step S4, it is determined whether temperature $T_M$ detected by temperature sensor 10 is higher than predetermined temperature $T_1$. It is desirable that predetermined temperature $T_1$ is set so as to be an upper limit temperature that does not cause any influence on the life of electric motor 9. If it is determined in step S4 that $T_M \leq T_1$, the temperature of electric motor 9 is judged normal (the answer in step S5 is negative) and the program proceeds to step S6.

Figure 3:
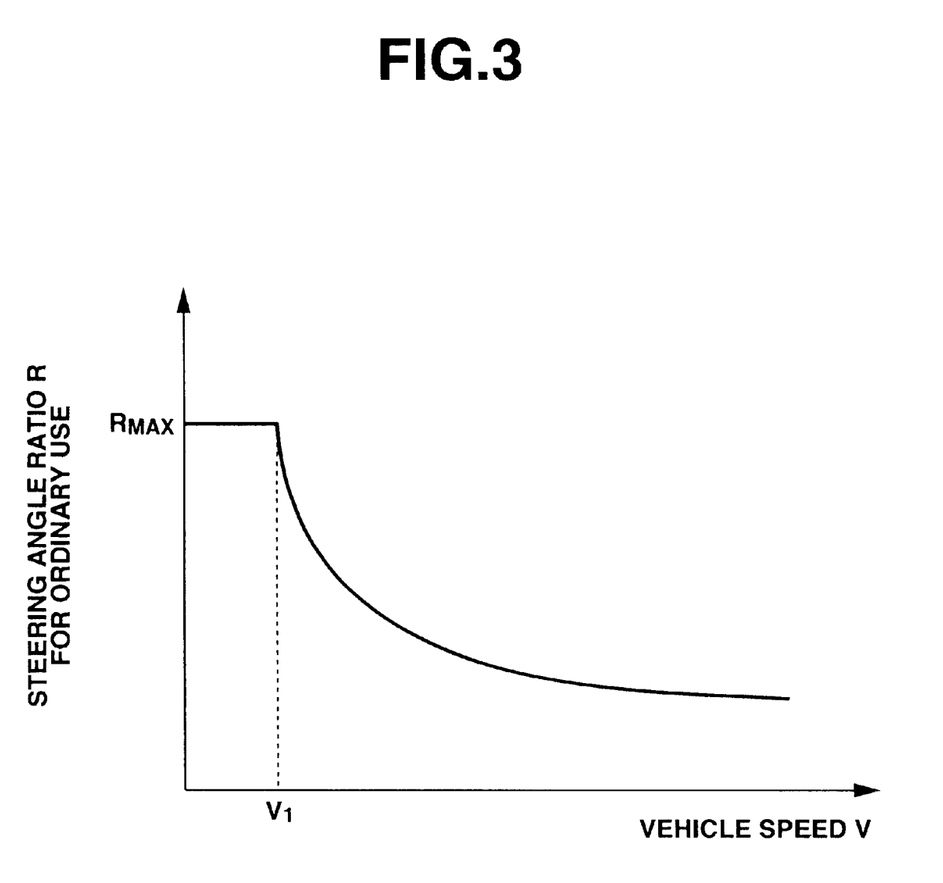
FIG. 3 is a control map for calculation of steering angle ratio for ordinary use that is used in the first embodiment and shows a relation between vehicle speed and steering angle ratio for ordinary use.

In step S5, steering angle ratio R for ordinary use is determined based on vehicle speed V that was read in step S1 and by reference to a control map for calculation of steering angle ratio for ordinary use that shows a relation between vehicle speed V and steering angle ratio R ($\theta_{OUT}/\theta_{IN}$) for ordinary use that is a ratio between output angle $\theta_{OUT}$ of steerable road wheels that are steered and input angle $\theta_{IN}$ by a steering operation. The control map for calculation of steering angle ratio for ordinary use is previously stored in a memory provided to controller 13 and is set as shown in FIG. 3, with vehicle speed V as abscissa and steering angle ratio R for ordinary use as ordinate, so that steering angle ratio R for ordinary use becomes a constant high steering angle ratio $R_{MAX}$ when vehicle speed V is in a low speed range from 0 (zero) to certain set vehicle speed $V_1$ and decreases nonlinearly and inversely proportionally to vehicle speed V when vehicle speed V increases gradually beyond $V_1$.

Then, the program proceeds to step S6 where steering angle ratio control amount $C_R$ that is determined in step S5 based on steering angle ratio R for ordinary use is outputted, as a drive signal, to electric motor 9 in steering angle ratio varying mechanism 3, thereby executing an ordinary steering angle ratio control, and then returns to step S1.

On the other hand, if it is determined in step S4 that $T_M > T_1$ (the answer in step S5 is affirmative), electric motor 9 is judged to be overheated, and the program proceeds to step S7. In step S7, it is determined whether temperature $T_M$ of electric motor 9 detected by temperature sensor 10 is higher than overheat temperature $T_2$ that is higher than $T_1$. It is desirable that $T_2$ is set to an upper limit temperature under which electric motor 9 can be operated but above which electric motor 9 needs be stopped immediately. Namely, if it is determined in step S7 that $T_M \leq T_2$, electric motor 9 is judged not to be overheated to such an extent as to be stopped immediately, and the program proceeds to step S8.

Figure 4:
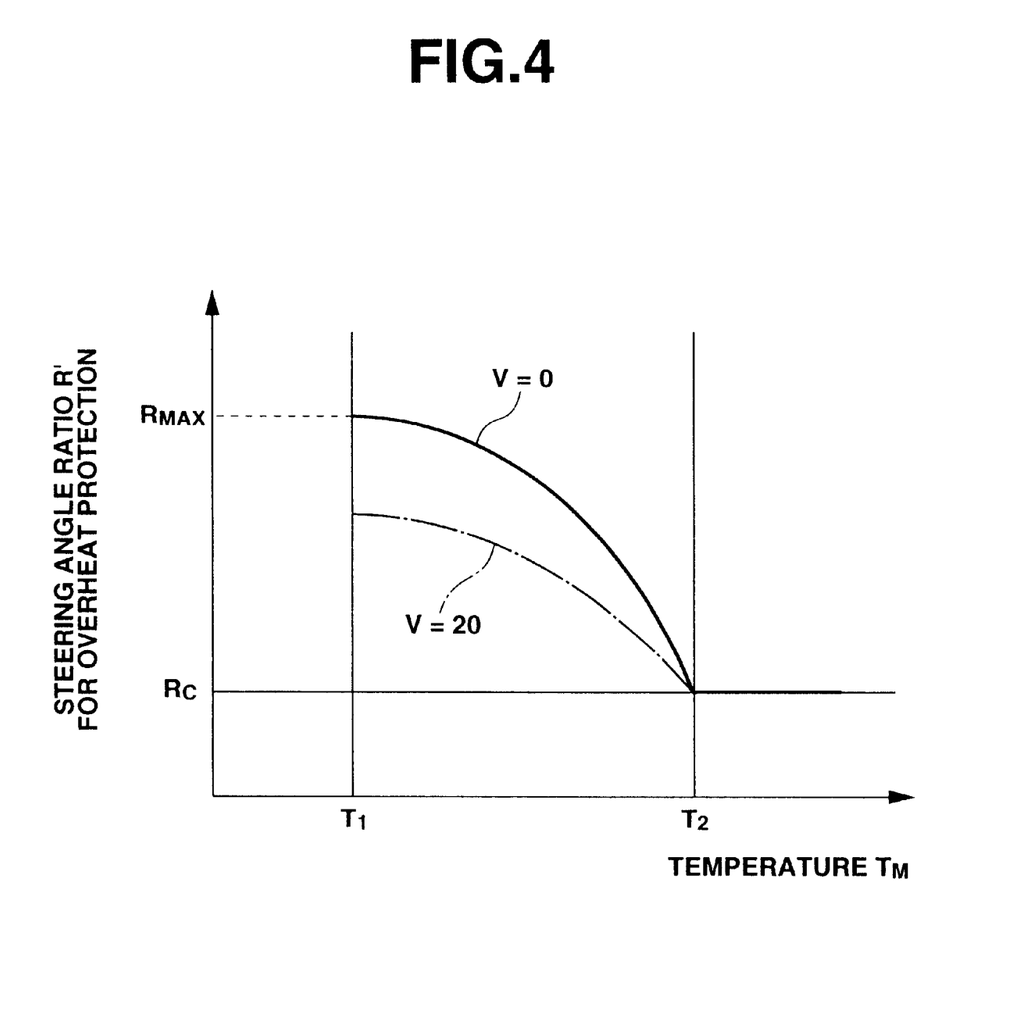
FIG. 4 is a control map for calculation of steering angle ratio for overheat protection that is used in the first embodiment and provided for every vehicle speed range, and shows a relation between temperature of electric motor and steering gear ratio for overheat protection.

In step S8, it is selected, based on vehicle speed V that was read in step S1, a control map for corresponding one of vehicle speed range sections into which a predetermined vehicle speed range is divided, the control map being for calculation of steering angle ratio for overheat protection that shows a relation between temperature $T_M$ of electric motor 9 and steering angle ratio $R'(\theta_{OUT}/\theta_{IN})$ for overheat protection that is a ratio of output angle $\theta_{OUT}$ of steerable road wheels 8 and input angle $\theta_{IN}$ by a steering operation. The control map for calculation of steering angle ratio for overheat protection is provided for every predetermined vehicle speed range and is stored in the memory of controller 13. The control map for vehicle speed V that is, for example, 0 km/h is set as shown in FIG. 4, with temperature $T_M$ as abscissa and steering angle ratio R' for overheat protection as ordinate, so that in contrast to steering angle ratio $R_{MAX}$ for ordinary use that is indicated by the dotted line curve and that is for use under predetermined temperature $T_1$, steering angle ratio R' for overheat protection that is indicated by the solid line curve, when temperature $T_M$ of electric motor 9 rises gradually beyond predetermined temperature $T_1$ up to predetermined temperature $T_2$, decreases toward conventional gear ratio $R_C$ nonlinearly and inversely proportional to temperature $T_M$. Further, when vehicle speed V is 20 km/h, smaller steering angle ratio R' results as indicated by the one-dot chain line as compared with steering angle ratio for vehicle speed V of 0 km/h.

In step S9, steering angle ratio R' for overheat protection is calculated on the basis of motor temperature $T_M$ that was read in step S3, by reference to the control map for calculation of steering angle ratio for overheat protection. Then, the program proceeds to step S6.

In step S6, steering angle ratio control amount $C_R'$ based on steering angle ratio R' for overheat protection that was determined in step S9 is outputted as a drive signal to electric motor 9 thereby executing a steering angle ratio control at overheat protection. Then, the program returns to step S1.

Figure 5:
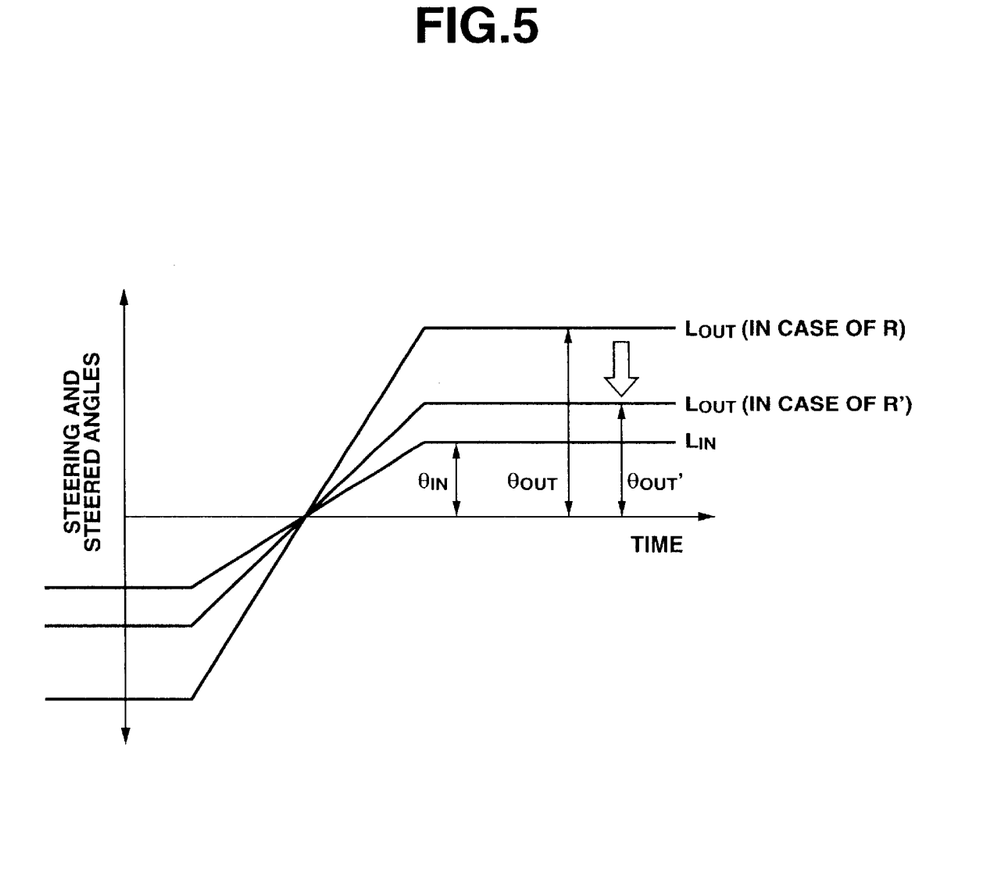
FIG. 5 is a graph showing a relation between steering and steered angles and elapsed time in the first embodiment.

Herein, as shown in FIG. 5, in case of steering angle R for ordinary use, steered output angle $\theta_{OUT}$ indicated by line $L_{OUT}$ is obtained with respect to line $L_{IN}$ that represents input angle $\theta_{IN}$ by a steering operation. When the steering angle ratio is changed to R' for overheat protection, output angle $\theta_{OUT}$ for the same input angle $\theta_{IN}$ is made smaller so as to become equal to angle $\theta_{OUT}'$ indicated by line $L_{OUT}'$. This makes it possible to decrease the load torque of electric motor 9, thereby maintain a good responsiveness by small current and suppress a delay in steering angle ratio varying operation.

Figure 6A:
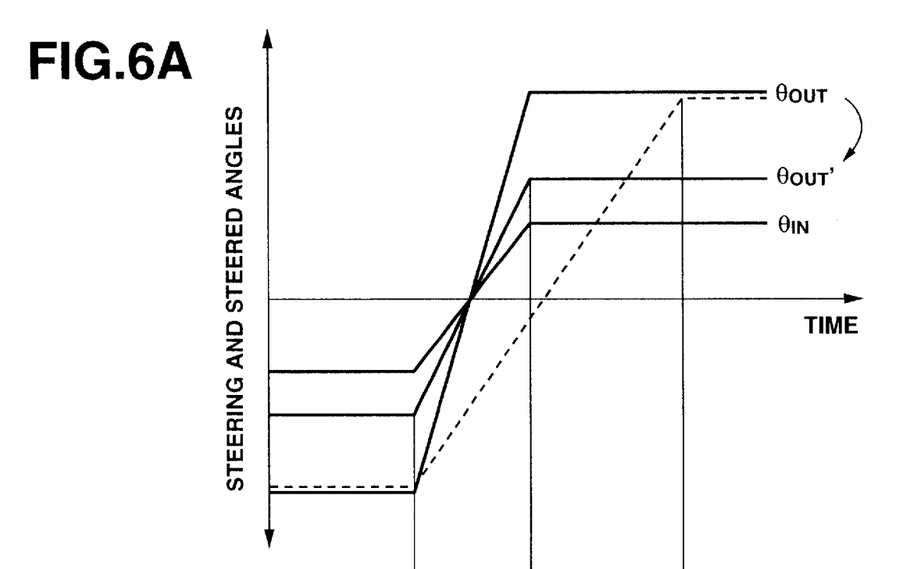
FIGS. 6A and 6B are graphs showing a relation between steering and steered angles and elapsed time and a relation between current and elapsed time in the first embodiment, respectively.
Figure 6B:
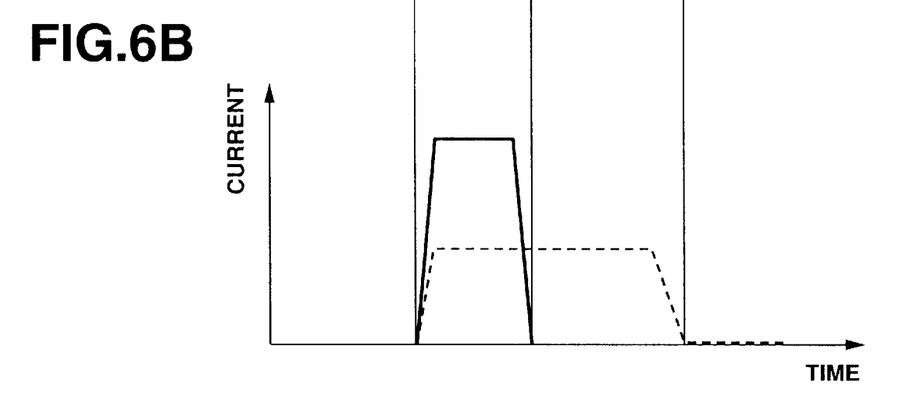

FIGS. 6A and 6B show a relation between steering and steered angles and elapsed time and a relation between current value and elapsed time when a driver performs a rapid steering operation, respectively. As shown in FIG. 6A, since the steering angle ratio is small at overheat protection, the followability of output angle (steered angle) $\theta_{OUT}'$ to input angle (steering angle) $\theta_{IN}$ is not deteriorated similarly to that described with respect to FIG. 5 even when the steering operation is rapid but the command current to electric motor 9 increases as indicated by the solid line in FIG. 6B since the steering angle ratio varying operation is rapid. However, the time during which the current is increased is short by the effect of a good responsiveness, so that the calorific value at this instance is equal to that resulting when the responsiveness of steered angle is deteriorated by the overheat protection of restricting the current value of electric motor 9 and resultantly the time necessitated for variation of the steering angle ratio is increased as indicated by the dotted line in FIG. 6B. Accordingly, even when a driver performs a rapid steering operation, overheat protection of electric motor 9 similar to the case a current value is restricted can be realized while maintaining a good responsiveness to the steering operation.

If it is determined in step S7 that $T_M>T_2$ (the answer in step S7 is affirmative), electric motor 9 is judged to be overheated to such an extent that requires electric motor 9 to be stopped immediately. Then, the program proceeds to step S10 where control of electric motor 9 is stopped. In step S11, a warning signal is outputted to warning circuit 14 with a view to warning the driver of overheat of electric motor 9. By warning circuit 14, a warning sound is produced or a warning lamp is lighted, and thereafter the program returns to step S1.

In the procedure of FIG. 2 according to the first embodiment, the control in step S1 and vehicle speed sensor 12 constitute a vehicle speed detecting means, the control in step S2 and steering angle sensor 11 constitute a steering angle detecting means, and the control in step S3 and temperature sensor 10 constitute an electric drive unit temperature detecting means. Further, the control in steps S4, S5, S7, S8 and S9 constitutes a steering angle ratio determining section or means, and the control in steps S7, S8 and step S9 constitutes an electric drive unit overheat protecting section or means, and the control in steps S6 and S10 constitutes a steering angle ratio control section or means.

Accordingly, when temperature $T_M$ of electric motor 9 that is detected by temperature sensor 10 is lower than predetermined temperature $T_1$, an ordinary steering angle ratio control in steps S5 and S6 is executed. At this time, by reference to the control map for calculation of steering angle ratio for ordinary use that is previously stored in controller 13, steering angle ratio R for ordinary use, corresponding to vehicle speed V is determined. Namely, when vehicle speed V is in a low speed range, e.g., for garaging a vehicle, the steering angle ratio is made larger thereby lowering a steering effort of a driver. When vehicle speed V increases gradually so as to be in a high speed range, the steering angle ratio is made smaller for preventing an excessively quick or prompt action of a vehicle. Steering angle ratio control amount $C_R$ based on the thus determined steering angle ratio for ordinary use is outputted as a drive signal to electric motor 9. When electric motor 9 is driven to rotate, steering angle ratio control mechanism 3 moves the axis of the input shaft to vary the eccentricity and thereby the steering angle ratio.

In case, from this condition, temperature $T_M$ of electric motor 9 increases gradually beyond predetermined temperature $T_1$ but is equal to or lower than predetermined temperature $T_2$, the steering angle ratio control at overheat protection in steps from S7 onward is started. Firstly, when vehicle speed V is in a low speed range, controller 13 selects a control map of steering gear ratio for overheat protection, that is for low vehicle speed, and steering angle ratio R' for overheat protection is determined based on temperature $T_M$ of electric motor 9 having been read, by reference to the selected control map for overheat protection and stored.

At this time, in case vehicle speed V is constant and temperature $T_M$ of electric motor 9 increases, steering angle ratio R' to be determined decreases. In case temperature $T_M$ of electric motor 9 is constant and vehicle speed V increases gradually, the control map for calculation of steering angle ratio for overheat protection is changed from one to another since the control map is provided for each of vehicle speed range sections into which a predetermined vehicle speed range is divided. Thus, the steering angle ratio for overheat protection is always smaller than corresponding steering angle ratio R for ordinary use and becomes smaller with increase of vehicle speed V. Namely, steering angle ratio R' for overheat protection is always varied depending upon variations of vehicle speed V and temperature $T_M$ of electric motor 9. Steering angle ratio control amount $C_R$ based on determined steering angle ratio R' for overheat protection is outputted as a drive signal to electric motor 9 to vary the steering angle ratio in steering angle ratio varying mechanism 3.

When temperature $T_M$ of electric motor 9 rises beyond predetermined temperature $T_2$ due to such abnormal overheat that causes temperature $T_M$ of electric motor 9 to continue rising even though overheat protection is performed or due to such overheat that is so rapid as to make overheat protection not useful, electric motor 9 is stopped immediately and a warning indicative of it is produced.

In this manner, in the above described first embodiment, temperature $T_M$ of electric motor 9 and vehicle speed V are detected, and when electric motor temperature $T_M$ rises beyond predetermined temperature $T_1$ so that electric motor 9 is overheated, controller 13 selects a control map for calculation of steering angle ratio for overheat protection, corresponding to vehicle speed V and determines steering angle ratio R' for overheat protection, based on temperature $T_M$ of electric motor 9 and by reference to the control map. Steering angle ratio control amount $C_R$ based on determined steering angle ratio R' for overheat protection is outputted to electric motor 9 to make smaller the steering angle ratio in steering angle ratio varying mechanism 4. Thus, it becomes possible to decrease the load torque of electric motor 9, maintain a good responsiveness and followability to a steering operation and perform overheat protection similar to that is attained by restricting allowable current of electric motor 9.

Figure 7:
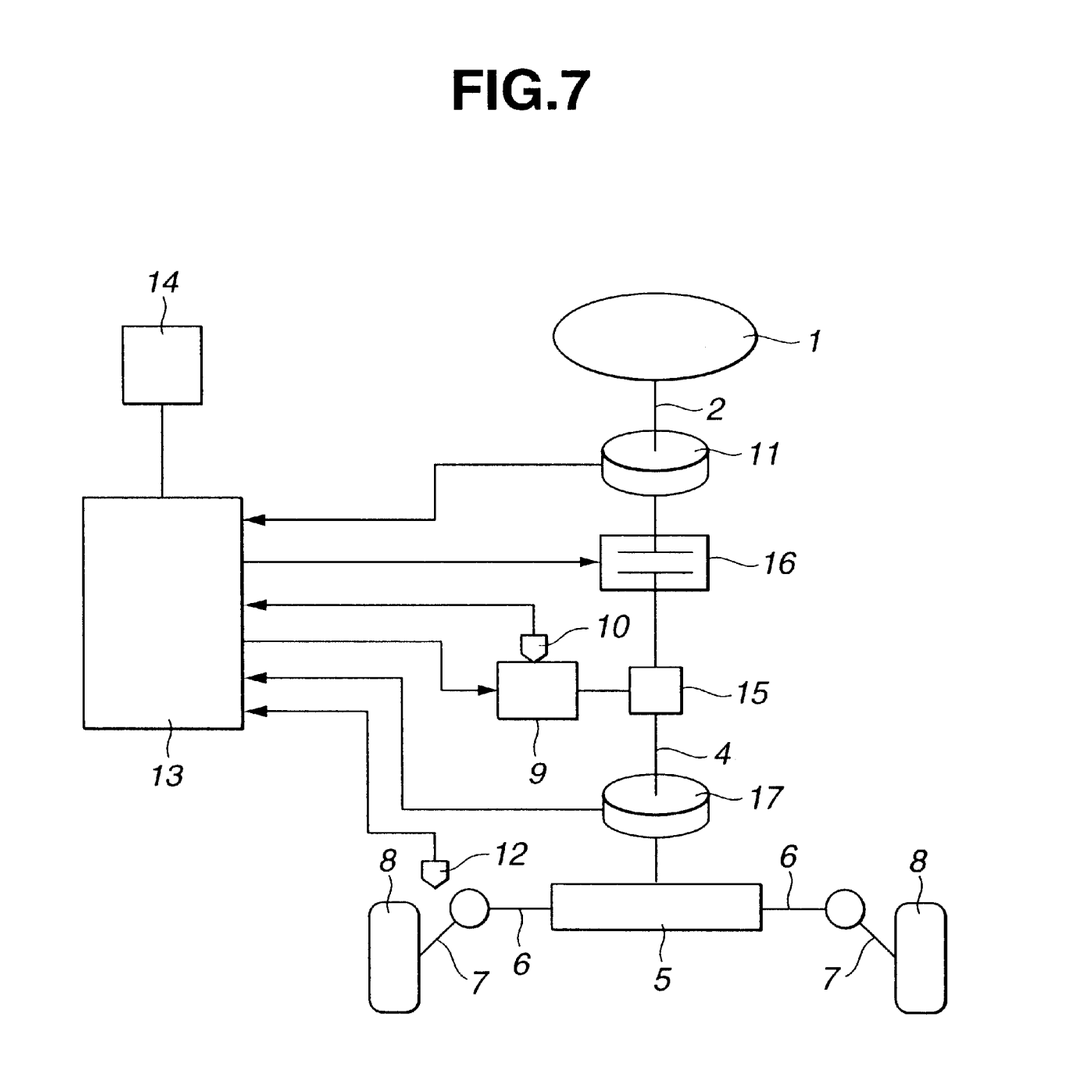
FIG. 7 is a schematic view of a steering angle ratio control system according to a second embodiment of the present invention.

Then, second embodiment will be described with reference to FIGS. 7 and 8 in which like parts are designated by like reference numerals.

The steering angle ratio control system of the second embodiment is of the so-called steer-by-wire type in which an input shaft operated by a steering operation and an output shaft operating steerable road wheels are mechanically separated from each other in contrast with those which are mechanically connected by way of steering angle ratio varying mechanism 3 in the first embodiment.

Namely, in the second embodiment, steering angle ratio varying mechanism 3 in the first embodiment is omitted, and steering shaft 2 serving as an input shaft and pinion shaft 4 serving as an output shaft and operatively connected to steered road wheels 8 are mechanically separated from each other. The second embodiment is adapted to control the steered angle of steerable road wheels 8 by transmitting a rotational drive power of electric motor 9 to pinion shaft 4 by way of speed reducer 15. Accordingly, electric motor 9 and speed reducer 15 constitute a steering angle ratio varying means. Except for the above, the second embodiment is similar to the first embodiment. Further, between steering angle sensor 11 and speed reducer 15 is disposed abnormal time connecting mechanism 16 that mechanically connects steering shaft 2 to pinion shaft 4 when it receives, at an abnormal time that will be described later, an abnormal time operation instruction. Further, to pinion shaft 4 is provided steered angle sensor 17 for detecting steered angle $\theta_W$ of steerable road wheels 8.

Abnormal time connecting mechanism 16 is constructed of, for example, an electromagnetic clutch and constructed so as to mechanically connect steering shaft 2 to pinion shaft 4 when receiving an abnormal time operation instruction, i.e., when supplied with an exciting current and put in an energized condition. Except for the above, the structure of this embodiment is substantially similar to that of the first embodiment of FIG. 1. Thus, similar parts to those of FIG. 1 are designated by like reference characters and detailed description thereto is omitted.

Figure 8:
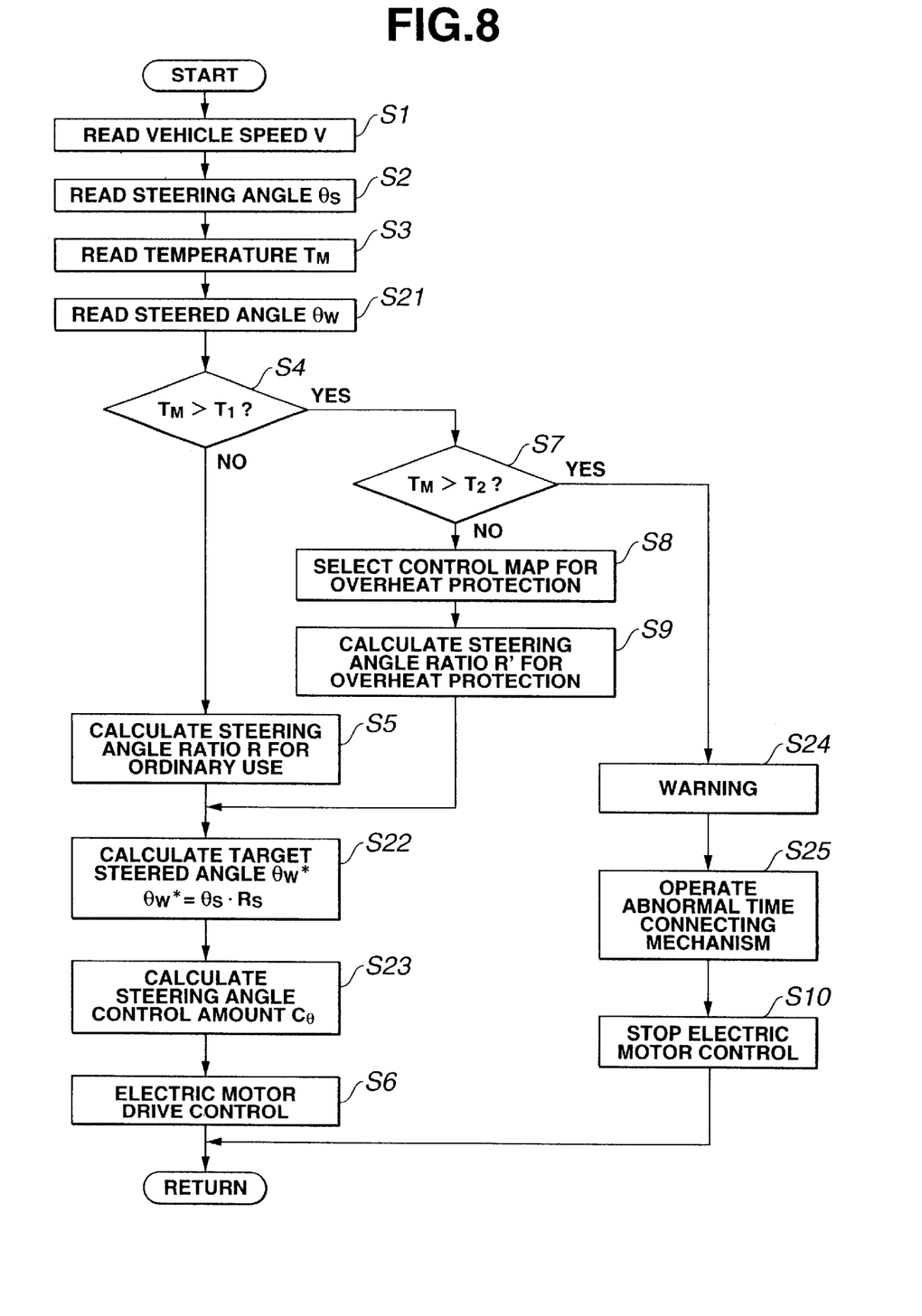
FIG. 8 is a flowchart of a control for protecting an electric motor from overheating that is executed by the second embodiment.

The electric motor overheat protection control executed in controller 13 is similar to that of the first embodiment except for that steps S21 to S235 are added, as shown in FIG. 8. Thus, like and corresponding steps are designated by like reference characters and repeated description thereto is omitted.

In steps S1 to S3, various signals are read. Then, the program proceeds to step S21 where steered angle $\theta_W$ of steerable road wheels 8 detected by steered angle sensor 17 is read and thereafter to step S4. When temperature $T_M$ of electric motor 9 is equal to or lower than predetermined temperature $T_1$, steering angle ratio R for ordinary use is determined in step S5 and is stored as $R_S$. Then, the program proceeds to step S22 where target steered angle $\theta_W{}^*(R_S \cdot \theta_S)$ of steerable road wheels 8 is calculated from steering angle ratio R for ordinary use and steered angle $\theta_S$ read in step S2 and thereafter proceeds to step S23.

In step S23, steered angle control amount $C_\theta$ for electric motor 9 is calculated based on steered angle $\theta_W$ read in step S21, target steered angle $\theta_W{}^*$ calculated in step S22 and the reduction ratio of speed reducer 15. Then, in step S6, steered angle control amount $C_\theta$ is outputted as a drive signal to electric motor 9 thereby executing steering angle ratio control for ordinary use. Then, the program returns to step S1.

If it is determined in step S7 that $T_M > T_2$ (the answer in step S7 is affirmative), electric motor 9 is judged to be overheated to such an extent that requires electric motor 9 to be stopped immediately and the program proceeds to step S25.

In step S25, exciting current is supplied to abnormal time connecting mechanism 16 thereby mechanically connecting steering shaft 2 to pinion shaft 4. Thereafter, the program proceeds to step S10 where electric motor 9 is stopped thereby finishing the electric motor overheat protecting process.

In the procedure in FIG. 8 according to the second embodiment, the control in step S1 and vehicle speed sensor 12 constitute a vehicle speed detecting means, the control in step S2 and steering angle sensor 11 constitute a steering angle detecting means, the control in step S3 and temperature sensor 10 constitute an electric drive unit temperature detecting means, and the control in step S21 and steered angle sensor 17 constitute a steered angle detecting means. Further, the control in steps S4, S5, S7, S8 and S9 constitutes a steering angle ratio determining section or means, the control in steps S7, S8 and S9 constitutes an electric drive unit overheat protecting section or means, the control in step S22 constitutes a target steered angle calculating section or means, and the control in steps S23, S6 and S1 constitutes a steering angle ratio control section or means.

Accordingly, when temperature $T_M$ of electric motor detected by temperature sensor 10 is equal to or lower than predetermined temperature $T_1$, steering angle ratio R for ordinary use is determined. If, at this time, steering wheel 1 in the neutral position is turned by the driver, for example, clockwise, steered angle control amount $C_\theta$ based on determined steering angle ratio R is outputted as a drive signal to electric motor 9. This causes electric motor 9 to be driven clockwise and transmit a clockwise drive power to pinion shaft 4, thus varying the rotational amount of pinion shaft 4 and controlling the steered angle of steerable road wheels 8. Further, when, on the contrary, the driver turns steering wheel 1 counterclockwise, the rotational amount of pinion shaft 4 is controlled in accordance with the above-described procedure thereby controlling the steered angle.

In case, from this condition, temperature $T_M$ of electric motor 9 increases gradually beyond predetermined temperature $T_1$ but is equal to or lower than predetermined temperature $T_2$, the steering angle ratio control for overheat protection in steps from S7 onward is started, i.e., the control map for calculation of steering angle ratio for overheat protection corresponding to vehicle speed V is selected and steering angle ratio R' for overheat protection is determined based on read temperature $T_M$ of electric motor 9 by reference to the control map for overheat protection.

Then, target steered angle $\theta_W^*(R_S \cdot \theta_S)$ is calculated from steering angle ratio R' for overheat protection that is stored as $R_S$ and steering angle $\theta_S$ detected by the steering angle detecting means, and steering angle control amount $C_\theta$ is calculated based on target steered angle $\theta_W^*$, steered angle $\theta_W$ detected by steering angle sensor 11 and the reduction ratio of speed reducer 15 and is outputted to electric motor 9.

At the abnormal time when temperature $T_M$ of electric motor 9 rises beyond predetermined temperature $T_2$ due to such abnormal overheat that causes temperature $T_M$ of electric motor 9 to continue rising even though overheat protection is performed or due to such overheat that is so rapid as to make overheat protection not useful, a warning indicative of the abnormality is first made. Then, supply of exciting current to abnormal time connecting mechanism 16 is started to mechanically connect steering shaft 2 to pinion shaft 4 and immediately thereafter electric motor 9 is stopped.

In this manner, target steered angle $\theta_W^*$ is calculated based on steering angle $\theta_S$ resulting from a steering operation and the determined steering angle ratio. Electric motor 9 rotates pinion shaft 4 on the output side so that steered angle $\theta_W$ detected by steered angle sensor 17 coincides with target steered angle $\theta_W^*$. Thus, even if steering shaft 2 and pinion shaft 4 are mechanically separated from each other, an accurate steering angle control can be made based on the actual steered angle $\theta_W$ of steerable road wheels that is fed back to controller 14 while making it possible to perform overheat protection of electric motor 9 similarly to the first embodiment.

Further, since the second embodiment is structured so as to mechanically connect steering shaft 2 to pinion shaft by means of abnormal time connecting mechanism 16 when temperature $T_M$ of electric motor 9 rises beyond overheat temperature $T_2$ that is higher than predetermined temperature $T_1$, it not only can attain a steering operation continuously even at the abnormal time but can assuredly prevent burning of electric motor 9 that is otherwise caused due to such abnormal overheat that causes the electric drive unit to continue to be overheated even though overheat protection is performed or due to such overheat that is so rapid as to make overheat protection not useful.

The entire contents of Japanese Patent Application P2001-315534 (filed Oct. 12, 2001) are incorporated herein by reference.

Although the invention has been described above by reference to a certain embodiment of the invention, the invention is not limited to the embodiment described above. Modifications and variations of the embodiment described above will occur to those skilled in the art, in light of the above teachings. For example, while in the first embodiment, it has been described and shown that by steering angle ratio R' for overheat protection output angle $\theta_{OUT}'$ for input angle $\theta_{IN}$ is made smaller than output angle $\theta_{OUT}$ at an ordinary time. In this connection, if rated output angle $\theta R_{OUT}$ at an ordinary time for input angle $\theta_{IN}$ is desired at overheat protection, an increased steering effort by the driver is necessitated. In this case, it will do to set larger the steering angle ratio of the output angle $\theta_{OUT}$ to the input angle $\theta_{IN}$ that is previously determined structurally so that rated output angle $\theta R_{OUT}$ for input angle $\theta_{IN}$ at an ordinary time is obtained. Further, while in the first embodiment the steering angle ratio has been described as being varied by varying steered angle $\theta_W$ based on steering angle $\theta_S$ that is varied by a steering operation of a driver, this is not for the purpose of limitation but, on the contrary, the steering angle $\theta_S$ is varied based on steered angle $\theta_W$ thereby varying the steering angle ratio. Further, while in the first embodiment it has been described to attach temperature sensor 10 to electric motor 9 to detect the temperature thereof, this is not for the purpose of limitation but the temperature may be estimated from the resistance value between the terminals that is calculated based on the current value based on the voltage and the current value across the terminals of electric motor 9. Further, while the first embodiment has been described and shown as to a steering system which is not provided with a hydraulic cylinder and an electric drive unit for assisting a steering effort of a driver, this is not for the purpose of limitation but the present invention may be applied to a power steering system. Further, while the first embodiment has been described and shown as being applied to a two-wheel steer vehicle, this is not for the purpose of limitation but the present invention may be applied to a four-wheel steer vehicle. In a four-wheel steer vehicle, it will do to determined the steering angle ratio based on vehicle state parameters detected by various sensors such as, in addition to vehicle speed sensor, a yaw rate sensor for detecting a vehicle yaw rate, a friction coefficient detecting sensor for detecting a friction coefficient between tire and road surface, an inclination sensor for detecting an inclination of road surface and an acceleration sensor for detecting acceleration in the longitudinal and lateral directions of a vehicle. Further, while in the second embodiment abnormal time connecting mechanism 16 has been described as being constituted by an electromagnetic clutch, this is not for the purpose of limitation and, for example, a hydraulic clutch, dog clutch or the like clutch whose operation is controlled electrically or another mechanical connecting device may be used. Further, abnormal time connecting mechanism 16 may be constituted by a planetary gear with a ring gear being connected to steering shaft 2, a pinion carrier being connected to pinion shaft 4 and a sun gear being connected to a brake such that at the normal time the brake is taken off to allow sun gears to rotate freely and at the abnormal time the brake is applied to fix the sun gears thereby transmitting a rotational force from steering shaft 2 to pinion shaft 4. The scope of the invention is defined with reference to the following claims.

What is claimed is:

1. A steering angle ratio control system comprising;
   a steering angle sensor for detecting a steering angle of a manual steering operating device;
   a steered angle sensor for detecting a steered angle of steerable road wheels;
   a vehicle speed sensor for detecting a vehicle speed;
   a steering angle ratio varying mechanism having an electric drive unit and capable of varying a steering angle ratio by the electric drive unit;

a temperature sensor for detecting the temperature of the electric drive unit; and a controller for controlling the steering angle ratio varying mechanism;

the controller including:

a steering angle ratio determining section for determining a steering angle ratio based on the vehicle speed;

a target steered angle calculating section for calculating a target steered angle of the steerable road wheels based on the steering angle ratio determined by the steering angle ratio determining section; and a steering angle ratio control section for controlling the steering angle ratio varying mechanism so that the steered angle of the steerable road wheels and the target steered angle coincide with each other;

wherein the steering angle ratio determining section includes an electric drive unit overheat protecting section that determines a smaller steering angle ratio when the temperature of the electric drive unit rises beyond a predetermined temperature as compared with a steering angle ratio determined thereby when the temperature of the electric drive unit is lower than the predetermined temperature.

2. A steering angle ratio control system according to claim 1, wherein the electric drive unit overheat protecting section determines, when the temperature of the electric drive unit is equal to or lower than the predetermined temperature, a steering angle ratio for ordinary use based on the vehicle speed and by reference to a control map for calculation of the steering angle ratio for ordinary use that represents a relation between the vehicle speed and the steering angle ratio for ordinary use and determines, when the temperature of the electric drive unit rises beyond the predetermined temperature, a steering angle ratio for overheat protection based on the vehicle speed and the temperature of the electric drive unit and by reference to a control map for calculation of the steering angle ratio for overheat protection that represents a relation between the temperature of the electric drive unit and the steering angle ratio for overheat protection and that is provided for each of vehicle speed range sections into which a predetermined vehicle speed range is divided.

3. A steering angle ratio control system according to claim 1, wherein the steering angle ratio control section stops the electric drive unit when the temperature of the electric drive unit rises beyond the predetermined temperature and further beyond an overheat temperature that is higher than the predetermined temperature.

4. A steering angle ratio control system according to claim 1, further comprising an input shaft connected to the manual steering operating device, an output shaft mechanically separated from the input shaft and operatively connected to the steerable road wheels, and an abnormal time connecting mechanism for mechanically connecting the input shaft to the output shaft when receiving an abnormal time operation instruction, wherein when the temperature of the electric drive unit rises beyond the predetermined temperature and further beyond an overheat temperature that is higher than the predetermined temperature, the steering angle ratio control section stops the electric drive unit after outputting the abnormal time operation instruction to the abnormal time connecting mechanism.

5. A steering angle ratio control system comprising;

steering angle detecting means for detecting a steering angle of manual steering operating means;

steered angle detecting means for detecting a steered angle of steerable road wheels;

steering angle ratio varying means for varying a steering angle ratio by an electric drive unit;

vehicle speed detecting means for detecting a vehicle speed;

steering angle ratio determining means for determining the steering angle ratio based on the vehicle speed;

target steered angle calculating means for calculating a target steered angle of the steerable road wheels based on the steering angle ratio determined by the steering angle ratio determining means;

steering angle ratio control means for controlling the steering angle ratio varying means so that the steered angle of the steerable road wheels and the target steered angle coincide with each other; and electric drive unit temperature detecting means for detecting the temperature of the electric drive unit;

wherein the steering angle ratio determining means includes an electric drive unit overheat protecting means that determines a smaller steering angle ratio when the temperature of the electric drive unit rises beyond a predetermined temperature as compared with a steering angle ratio determined thereby when the temperature of the electric drive unit is lower than the predetermined temperature.

6. A steering angle ratio control system comprising;

steering angle detecting means for detecting a steering angle of manual steering operating means;

steering angle ratio varying means having an electric drive unit and capable of varying a steering angle ratio by the electric drive unit;

vehicle speed detecting means for detecting a vehicle speed;

steering angle ratio determining means for determining a steering angle ratio based on the vehicle speed;

steering angle ratio control means for controlling the steering angle ratio varying means based on the steering angle ratio determined by the steering angle ratio determining means; and electric drive unit temperature detecting means for detecting the temperature of the electric drive unit;

wherein the steering angle ratio determining means includes an electric drive unit overheat protecting means that determines a smaller steering angle ratio when the temperature of the electric drive unit rises beyond a predetermined temperature as compared with a steering angle ratio determined thereby when the temperature of the electric drive unit is lower than the predetermined temperature.

* * * * *